Jan. 4, 1949. M. K. DURRIN Re. 23,071

HAND LOOM

Original Filed Nov. 15, 1944 2 Sheets-Sheet 1

Inventor

M. K. Durrin

By Randolph & Beavers

Attorneys

Jan. 4, 1949. M. K. DURRIN Re. 23,071
HAND LOOM
Original Filed Nov. 15, 1944 2 Sheets-Sheet 2
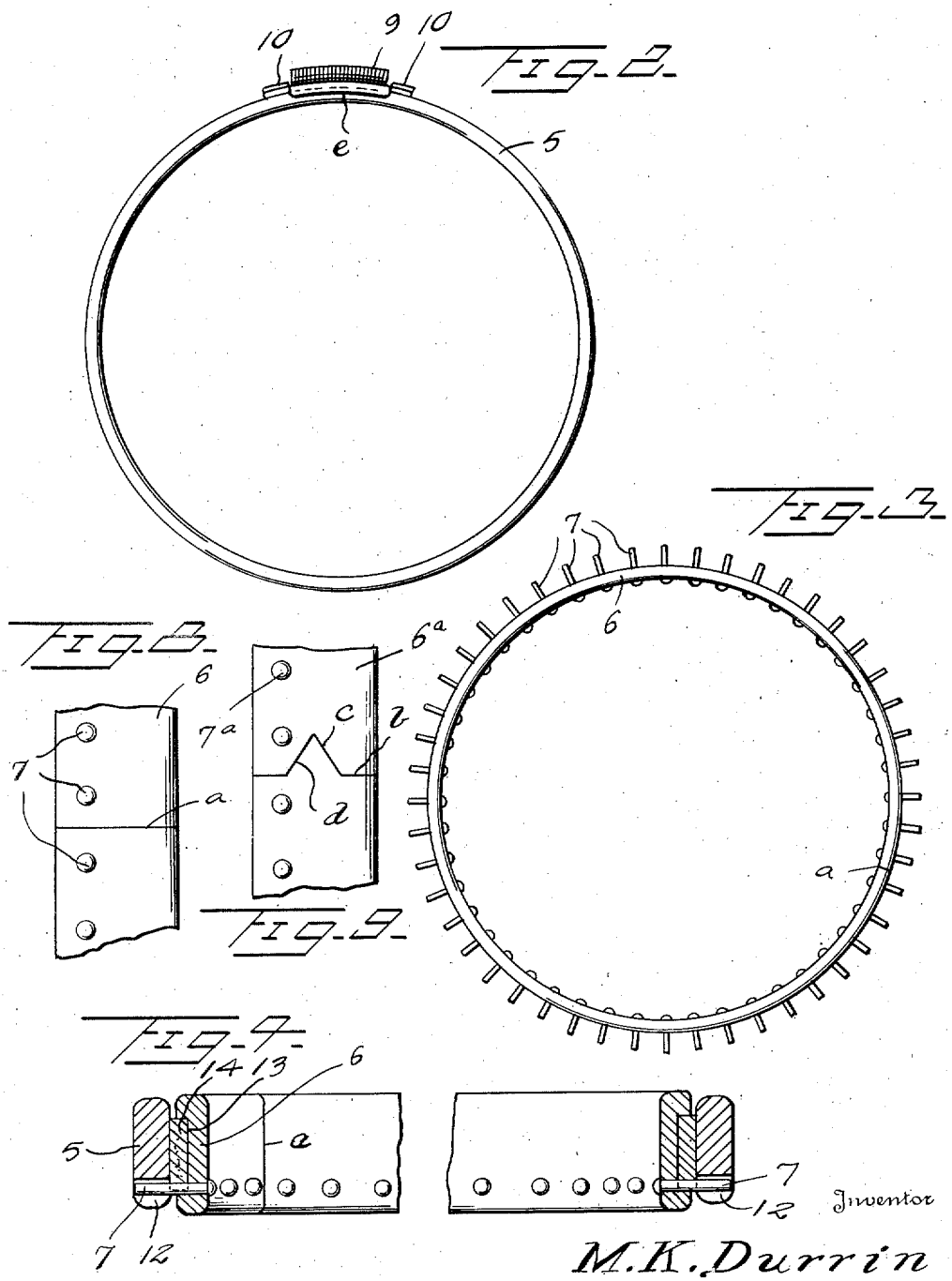
Inventor
M. K. Durrin
By Randolph & Beavers
Attorneys Reissued Jan. 4, 1949

Re. 23,071

UNITED STATES PATENT OFFICE 23,071

HAND LOOM

Monte K. Durrin, Little Rock, Ark.

Original No. 2,409,743, dated October 22, 1946, Serial No. 563,511, November 15, 1944. Application for reissue April 29, 1948, Serial No. 25,980

3 Claims. (Cl. 28—15)

This invention relates to hand looms upon which medallions of various designs can be produced with yarn or thread, such designs being especially attractive on afghans, bedspreads, tablecloths, etc.

An important object of the invention is to provide a loom of the character described including inner and outer hoops or frames, the inner one of which when detached from the other permits the release of the completed work, this being especially advantageous when working with inelastic material.

Another important object of the invention is to provide a hand loom employing inner and outer work frames, the outer frame serving to hold the inner frame in place and also as a guard against the work thread catching on the work supporting pins of the inner frame.

Various other important objects and advantages of the invention shall become apparent to the reader of the following description.

In the drawings:

Figure 2 is a bottom plan view of the outer ring.

Figure 3 is a top plan view of the inner ring.

Figure 4 is a cross section taken on line 4—4 of Figure 1.

Figure 8 is a fragmentary side elevational view of the inner ring.

Figure 9 is a fragmentary side elevational view of a modified form of inner ring.

Figure 1:
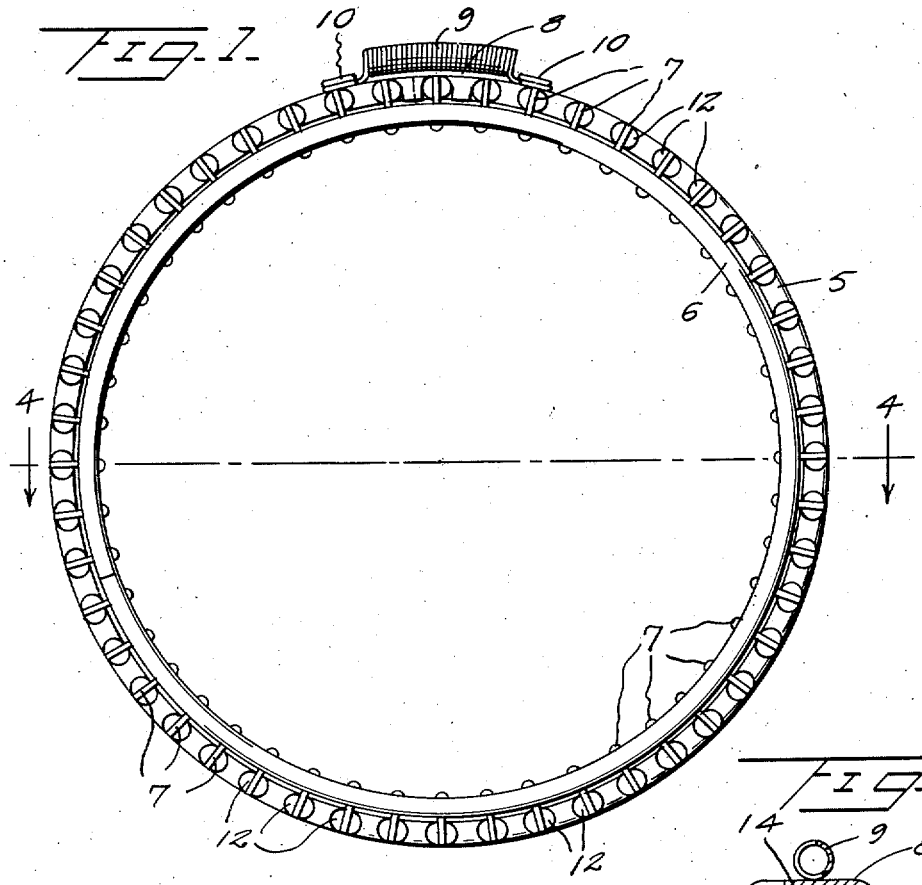
Figure 1 is a top plan view of the loom.
Figure 6:
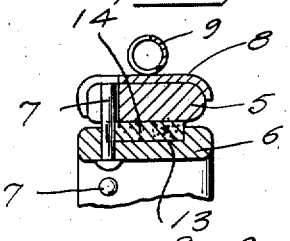
Figure 6 is a cross section on line 6—6 of Figure 5.
Figure 5:
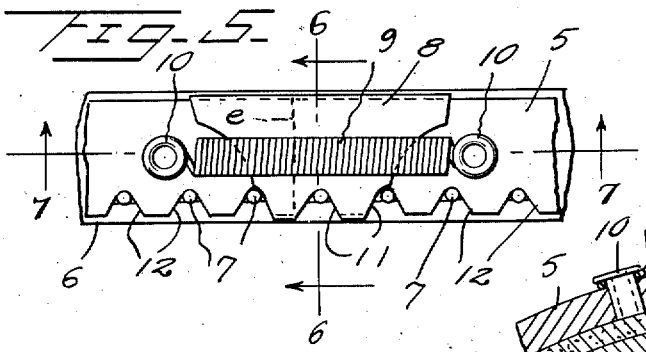
Figure 5 is a side elevational fragmentary view of the outer ring.
Figure 7:
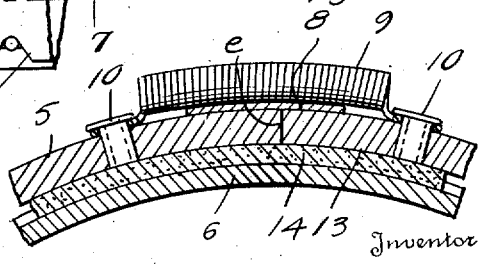
Figure 7 is a fragmentary longitudinal sectional view taken on line 7—7 of Figure 5.

Referring to the drawings wherein like numerals designate like parts, it can be seen that the loom is made up of an outer ring 5 and an inner ring 6.

The inner ring 6 is an annulus of metal, wood, plastic or any other satisfactory material split transversely as at *a*. This ring 6 adjacent its lower edge is provided with a multiplicity of outstanding work holding pins 7.

Figure 9 shows a slightly modified inner ring, the same being denoted by reference character 6*a*. This ring 6*a* has outstanding pins 7*a* and is split as at *b*, the split taking a different form from the split *a*, one end of the ring 6*a* having a V-notch *c* therein to receive a V-shaped protuberance *d* on the opposed end.

The outer ring 5 is also made up of any suitable material metal, wood, plastic, etc. and is split as at *e*. A metal guide 8 embrace the opposed end portions of the ring 5 to keep these ends of the ring properly aligned and over this guide 8 is coiled tension spring 9, extending longitudinally thereof and having its ends secured to rivets 10, 10 which are driven into the end portions of the ring 5.

One edge portion of the guide 8 is formed with V-notches 11 coinciding with like notches 12 in the corresponding edge of the outer ring 5, these notches being closely spaced and extending around the entire edge of the ring 5, to receive the pins 7 projecting outwardly from the inner 6. As shown in Figure 4, these V-notches receive the ends of the pins and guard against the pins catching on the work thread or threads.

It is preferable that the periphery of the inner ring 6 be formed with a shallow chamfer 13 to receive a strip 14 of felt or some other suitable frictional material to prevent the easy displacement of the outer ring 5 from the inner ring 6.

In the use of this loom, it can be seen that in the first instance, the threads are strung over the inner frame 6 and over the pins 7. When the thread has been properly strung and ready for weaving, the outer ring 5 is slipped over the inner ring 6 so that the pins 7 are out of the way, the outer ring serving as a guard for the pins so that the work thread can not become entangled therewith.

When the design has been woven and it is desired that the same be removed from the inner frame 6, the outer frame is first pulled away from the inner frame 6 and then by pulling the ends of the inner ring 6 apart, in a lateral direction, the ends may be disposed in overlapped relation in order to reduce the circumference, thereby loosening the design structure so that it may be readily slipped off of the pins 7.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A hand loom comprising an outer frame, an inner frame, said inner frame being provided with a multiplicity of outstanding work holding pins, the outer frame being provided with a multiplicity of notches for receiving the outer ends of said pins to guard against work thread catching thereon, the outer frame being split and a resilient connector between the ends of said outer frame, said resilient connector including a ridged guide, said guide having one edge notched to coincide with the notches of the adjacent edge of the outer frame.

2. A holder for lacework comprising a body surrounding a working area, said body including: an inner frame having a plurality of rigid outwardly extending projections spacedly disposed on its outer surface, said projections adapted to receive loops of lacework, said frame being cut transversely to provide abutting ends which permit its collapse inwardly; and an outer frame surrounding the inner frame and having interstices for receiving and nesting said projections, said outer frame being of a thickness at least equal to the extent of said projections.

3. A holder for lacework comprising a body surrounding a working area, said body including: a circular inner frame; a plurality of rigid outwardly extending radially spaced projections carried by said frame to receive loops of lacework strands, said frame being cut transversely to permit its collapse inwardly; and a circular outer frame snugly surrounding the inner frame and having notches for receiving and nesting said projections, said outer frame being of a thickness substantially equal to the outwardly projecting extent of said projections.

MONTE K. DURRIN.

REFERENCES CITED

The following references are of record in the file of this patent:

UNITED STATES PATENTS

| Number | Name | Date |
|---|---|---|
| 769,555 | Markes | Sept. 6, 1904 |
| 776,040 | Vilas | Nov. 29, 1904 |
| 780,208 | Lowe | Jan. 17, 1905 |
| 1,649,340 | Delciello | Nov. 15, 1927 |
| 1,659,925 | Schmidt | Feb. 21, 1928 |
| 1,929,278 | Hylander | Oct. 3, 1933 |

FOREIGN PATENTS

| Number | Country | Date |
|---|---|---|
| 133,911 | Great Britain | Oct. 23, 1919 |
| 147,910 | Germany | Nov. 21, 1902 |